June 11, 1940.  P. H. RUTHERFORD  2,203,927
ELECTRIC MOTOR
Filed Feb. 17, 1939

INVENTOR
PAUL H. RUTHERFORD
BY
Spencer, Hardman and Fehr
ATTORNEYS

Patented June 11, 1940

2,203,927

UNITED STATES PATENT OFFICE 2,203,927

ELECTRIC MOTOR

Paul H. Rutherford, Dayton, Ohio, assignor to General Motors Corporation, Detroit, Mich., a corporation of Delaware Application February 17, 1939, Serial No. 256,834

8 Claims. (Cl. 172—279)

This invention relates to improvements in electric motors and controlling means therefor.

It is among the objects of the present invention to provide an electric motor which, under normal load requirements, is adapted to have a predetermined torque and operate quietly and at its best power factor and highest efficiency. This motor, however, when subjected to a predetermined increase in load requirements over normal, is adapted to have a correspondingly greater torque while operating at lesser efficiency and a lower power factor.

The above object is attained by providing an electric motor with a plurality of windings and a control device which will automatically render certain of said windings effective for motor starting purposes, other of said windings effective when the load requirements on the motor are predeterminately normal and still other of said windings effective when the motor is subjected to load requirements predeterminately above normal.

Further objects and advantages of the present invention will be apparent from the following description, reference being had to the accompanying drawing wherein a preferred embodiment of one form of the present invention is clearly shown.

Figures 2, 3, 4:
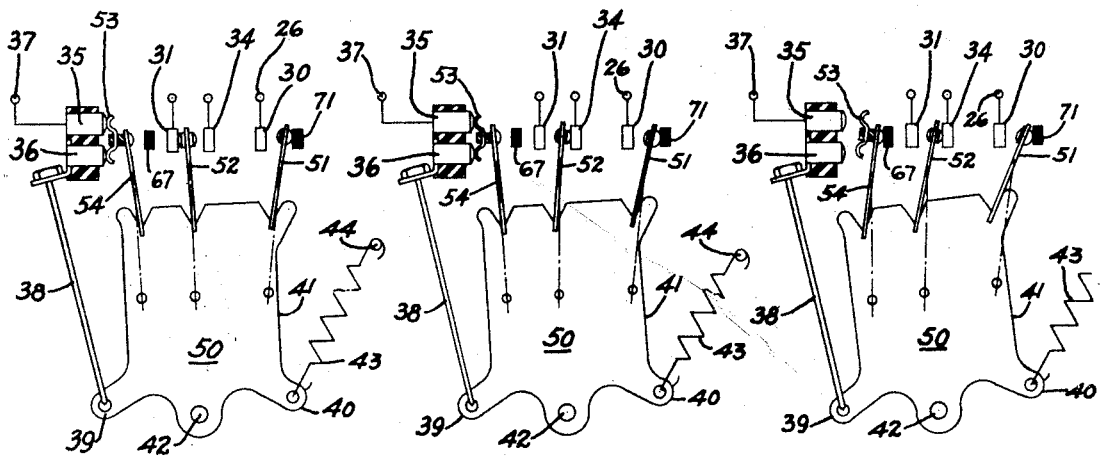
Figure 2 shows the control device in the position for closing the proper circuits while the motor is running under normal load requirements.

Figure 3 shows the control device shifted to lose circuits effective while the motor is running under load requirements predeterminately in excess of normal; and Figure 4 illustrates the control device in full circuit breaking position into which it is shifted when the motor is subjected to a dangerously excessive heavy load, becomes stalled or for any reason has an excessive current flow therethrough.

Figure 1:
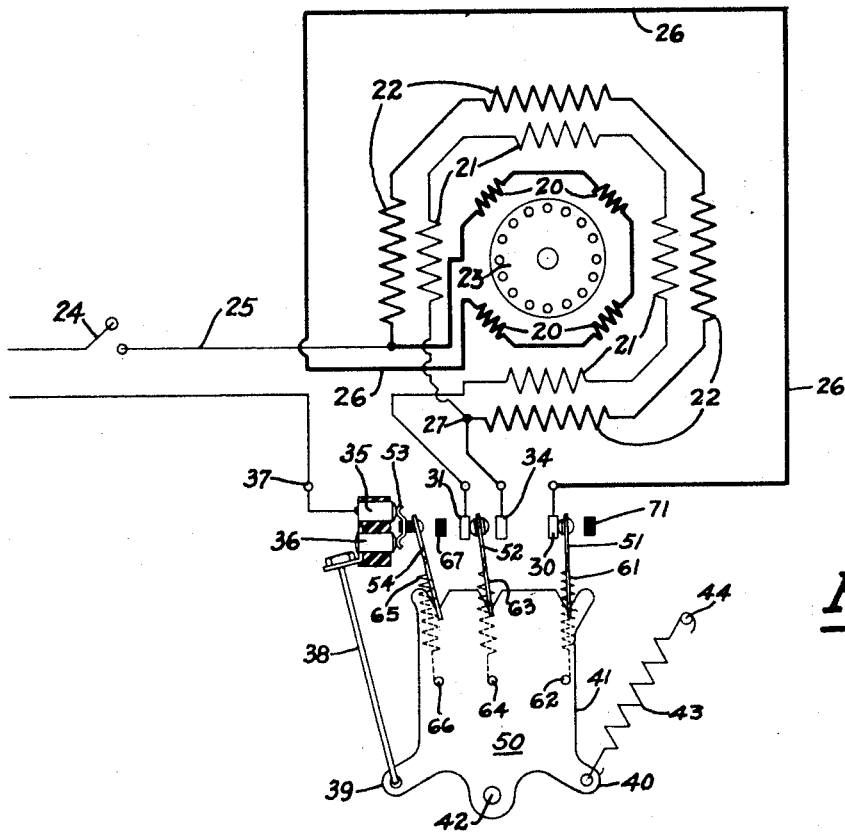
Figure 1 is a diagrammatic view showing the motor, its windings and circuit connections and the control device therefor. In this view the control device is shown in the position for completing the necessary starting circuit of the motor.

Referring to the drawing and particularly to the Figure 1 thereof, the motor shown diagrammatically comprises a plurality of windings designated by the numerals 20, 21 and 22, and a rotor 23.

The winding 20 is the phase winding and is referred to hereinafter as the starting winding. In the drawing it is shown in four sections, connected in series, one end thereof being connected to the one pole of the main power line switch 24 through the wire 25, the opposite end of said starting winding being connected to the stationary contact 30 of the control device 50 through the wire 26.

The winding 21 forming the supplementary portion of the main or running winding is also shown in four sections connected in series, one end thereof being connected to the primary running winding 22 at the point 27, the other end thereof being connected to the stationary contact 31 of the control device 50.

The third motor winding 22, which is another portion of the main or running winding and is referred to as the primary running winding is shown in four sections connected in series, one end thereof being connected to the wire 25 leading to the main power line switch 24, the other end connecting to the supplementary running winding 21 at the point 27, this common point of connection between the primary and supplementary running windings being connected to the stationary contact 34 of the control device 50.

The control device 50 has two other stationary contacts 35 and 36, the former being connected to the power line terminal 37, the latter having one end of the thermo-electric element 38 of the device in electrical contact therewith. The opposite end of this element 38 is anchored to 39, one of two oppositely disposed ears 39 and 40 provided on the tilting frame 41 of the control device and on opposite sides of its pivotal center 42. A spring 43 has one end secured to ear 40 of the frame 41, the other end of the spring being anchored to any suitable stationary pin 44. This spring 43 tends to rotate frame 41 counter-clockwise about its pivot 42 against the effect of the thermo-electric element 38. The element 38 may be of any suitable material which, when heated, will expand and increase in length. Such an increase in the length of element 38 permits spring 43 to become effective to tilt frame 41 counterclockwise about its pivot 42. Naturally, cooling of the element 38 will result in contraction and shortening thereof which tilts or rotates the frame 41 clockwise against the effect of spring 43.

The control device has three shiftable contact members 51, 52 and 53 each of which is pivotally supported in a V-shaped notch formed in frame 41, so that each contact member electrically engages said frame. Each contact member has a spring urging it into electrical contact with the frame and adapted upon tilting of the frame to flip its respective contact member from one side to the other depending upon the direction and degree of tilting of the frame.

In Figure 1, which shows the control device in normal, circuit closing position, contact member 51 engages its cooperating stationary contact 30 to close the circuit through the starting winding 20. It will be seen that the spring 61 has one end secured to the contact member 51 and its other end to a lug 62 on the frame 41. To hold the contact member 51 in engagement with the stationary contact 30 as shown in Figure 1, the points of anchorage of spring 61 must be on the side of the pivot point of contact member 51 more adjacent the stationary contact 30, so that spring 61 will urge contact member 51 counter-clockwise about its pivotal engagement with frame 41.

If, however, the points of anchorage of spring 61 are changed to the side of the pivot point of contact member 51 more remote from the stationary contact 30, by the counter-clockwise tilting of the frame 41 and the actual shifting of the pivot of movable contact member 51 thereby, spring 61 will quickly flip said contact member 51 clockwise about its pivotal engagement with frame 41 and out of engagement with its stationary contact 30 against the insulating stop 71 thus breaking the circuit through the starting winding 20 as shown in Figure 2. This movable contact of the control device is so arranged that a predetermined slight counter-clockwise rotation or tilting of the frame 41 out of its normal starting circuit closing position, is required to flip contact 51 into starting circuit breaking position as shown in Figure 2. Such a tilting of the frame 41 is effected by spring 43 which is rendered effective by the expansion and lengthening of the thermo-electric element 38 resulting from the heating up of said element due to the sudden surge of comparatively heavy current flow therethrough for starting purposes.

The second shiftable contact member 52 engages the stationary contact 31 when the frame 41 is in normal position as shown in Figure 1 or in the position as shown in Figure 2, where it has caused contact member 51 to be shifted to circuit breaking position. Normally, as in Figure 1, contact member 52 bears against its cooperating contact 31 at a greater angle than contact 51 against its stationary contact 30, being held in this tilted position against contact 31 by spring 63 anchored between the contact member 52 and the lug 64 on frame 41. However, when the frame 41 has been moved from its normal position as in Figure 1 to its starting circuit breaking position as in Figure 2, the contact member 52 will have been shifted to an angle of lesser degree from the vertical than normally so that only a small continued shifting of the frame counter-clockwise from the position as shown in Figure 2, is necessary to cause spring 63 quickly to flip contact member 52 out of engagement with its stationary contact 31 into engagement with its other cooperating stationary contact 34 as shown in Figure 3. Under these circumstances the circuit through the supplementary running winding 21 is broken while the circuit through the primary running winding is maintained. Contact member 52, like contact member 51, is urged into pivotal and electrical engagement with the frame 41 by its spring 63.

Contact member 53 differs from the other contact members 51 and 52 in that it is not in electrical engagement with the frame 41. On the contrary it is insulatingly carried by the arm 54 which like contacts 51 and 52 is urged into pivotal engagement with said frame by a spring 65 anchored between said arm and a lug 66 on the frame 41. Normally contact 53 engages its cooperating stationary contacts 35 and 36 completing the circuit from the main power terminal 37 to the thermoelectric element 38. It remains in such contact making position until the frame 41 has been tilted counter-clockwise sufficiently to move the pivot point of arm 54 to the side of a plane, passing through the anchorage points of spring 65, more adjacent the contact 53 at which time said contact 53 will be flipped from bridging engagement with its stationary contacts 35 and 36 and against the insulating stop 67 as shown in the Figure 4. Under these circumstances the connection of the motor with the power line or terminal 37 is completely broken and the motor inoperative.

It will be noted from the aforegoing description of the control device that its contacts are successively made and broken as the frame 41 thereof is tilted clockwise or counter-clockwise respectively. As it is tilted counterclockwise from normal position in Figure 1, first contact 51 will be flipped to break its circuit, then 52 to break one circuit and to make another, then contact 53 is shifted completely to break the entire circuit through the motor. Reversely, tilting of the frame clockwise will first cause contact 53 to bridge contacts 35 and 36 to connect the thermoelectric element 38 with the power terminal 37 then contact 52 will break the circuit at contact 34 and concurrently make it at contact 31 following which, contact 51 will complete the starting circuit by engaging contact 30.

The frame is tilted clockwise by the cooling and consequent contracting or shortening of the thermo-electric member 38 which overcomes the effect of spring 43. On the other hand, frame 41 is tilted counter-clockwise when heating of said element 38 results in its expansion or lengthening which permits spring 43 to become effective.

The electric motor and its control device operate in the following manner:

Normally the control device assumes the position as shown in Figure 1. To start the motor the operator closes the power line switch 24 completing the following circuits; from the switch 24 through the wire 25, starting winding 20, wire 26, to the stationary contact 30 of the control device. From this contact 30 current will enter the engaging movable contact 51, flow into the frame 41 with which said contact electrically engages, thence through the thermo-electric element 38 to contact 36, across the bridging contact 53 into contact 35 to the power line terminal 37. This completes the circuit through the starting winding 20. Another circuit from the line 25 flows into the primary running winding 22 to point 27 thence through the supplementary running windings 21, in series with the primary running windings 22, to stationary contact 31 of the control device, thence to the movable contact member 52 via frame 41, thermo-electric element 38 contacts 36, 53 and 35 to the terminal 37 of the opposite power line. These circuits through all of the windings now being completed, will cause the rotor 23 of the motor to rotate. The resultant heavy surge of starting current flowing through the thermo-electric element will, after a proper time during which the motor has attained its normal running speed, cause said thermo-electric element 38 to be heated resulting in an expansion or lengthening thereof. As this element lengthens, spring 43 will effect a turning or tilting of the frame 41 counter-clockwise which movement, when sufficient, shifting the pivotal point of movable contact member 51, to permit its spring 61 quickly to flip it out of engagement with the stationary contact 30 and against the insulating stop 71. Now the circuit through the starting winding 20 is completely broken, rendering said winding ineffective. The circuit through the primary and supplementary running windings in series is, however, maintained especially while the motor is running under light or predetermined normal load requirements under which conditions the current flow through the thermo-electric element is of such an amount as not to heat up the said element and cause a further expansion or lengthening thereof. Consequently spring 43 can not rotate or tilt the frame any more to cause shifting of contact 52 under normal load conditions.

In series connection, the primary and supplementary running windings are of low density and when they cooperate during normal load conditions the motor is functioning at its highest efficiency and best power factor providing, however, a comparatively low torque and operating quietly.

Assume now, that the motor is subjected to a load in excess of the aforesaid normal load and the motor is therefor required to provide a greater torque than that possible under the aforementioned conditions. The added load on the motor will increase the current flow therethrough and a consequent increased flow through the thermo-electric element 38. An increase in current flow through said element 30 will heat it up to a greater degree causing a further expansion and lengthening thereof. This renders the spring effective to again rotate or tilt the frame counter-clockwise from its normal running position as shown in Figure 2. Such tilting of frame 41 will cause spring 63 quickly to flip its contact 52 out of engagement with the stationary contact 31 and into engagement with the stationary contact 34 as shown in Figure 3. When contact 52 disengages contact 31 the circuit from the supplementary running winding is completely broken and said winding is therefore rendered completely inoperative. Concurrent engagement of contact 52 with contact 34 closes the circuit through the primary running winding 22 only so that while the motor is subjected to this increased load said primary winding 22, of comparatively lower density that the primary and supplementary windings together will cause the motor to operate at an increased torque and lesser efficiency. The power factor of the motor under these conditions is also correspondingly decreased.

If for any reason the motor should become stalled or if a dangerously excessive load be placed upon the motor, current flow through it and the thermo-electric element 38 would consequently increase causing a greater heating up of said element and therefore an increased expansion or lengthening thereof. This would permit the spring 43 to become effective to rotate or tilt the frame 41 from the position shown in Figure 3 to that of Figure 4 where the contact 53 is shown out of engagement with its cooperating stationary contacts 35 and 36. This breaks the circuit from the main feed line terminal 37 to the thermo-electric element 38 and consequently the motor and thus the motor is rendered completely inoperative thereby providing an overload protection for the motor. Naturally when the excessive load or other cause of excessive current flow through the motor is removed or if switch 24 is opened, current flow through the thermo-electric element is discontinued permitting it to cool and contract thereby to rotate or tilt the frame into its normal position against the effect of spring 43 thus returning the shiftable contact members thereof back to normal position as shown in Figure 1.

From the aforegoing it may be seen that applicant has conceived an improved motor which under predetermined high load requirements functions as an ordinary motor but which is constructed and arranged to be regulated by a control device so that it can function with greater efficiency and power factor at lower load requirements at which time a resultant decrease in motor torque is still sufficient properly to perform the necessary work.

While the form of embodiment of the present invention as herein disclosed constitutes a preferred form, it is to be understood that other forms might be adopted, all coming within the scope of the claims which follow.

What is claimed is as follows:

1. In a device of the character described, the combination with an electric motor having a starting winding and primary and supplementary running windings all of said windings cooperating during the starting of the motor; means adapted to render only the starting winding ineffective after the motor has been properly started and is running at normal load requirements; and means adapted to render only the supplementary running winding ineffective while maintaining the primary running winding effective when the motor is subjected to a load predeterminately in excess of the normal load.

2. In a device of the character described, the combination with an electric motor having a starting circuit including a phase winding and a running circuit including a primary and supplementary winding, all of said windings being effective for motor starting purposes; means acting in response to the flow of current through the motor for breaking the starting circuit; and means acting in response to a predeterminate increase in the flow of current through the motor for rendering the supplementary running winding ineffective and the primary running winding only effective to maintain proper motor operation.

3. A device as defined by claim 1, characterized, however, by the fact that another means is provided which is adapted, automatically to render all of the motor circuits ineffective when the motor is subjected to a load exceeding that at which the main running winding will safely operate the motor.

4. A device as defined by claim 2, characterized by the fact, however, that another means is provided which is adapted to render all of the motor circuits ineffective in response to an increase in the flow of current in the motor beyond a safe operating margin.

5. In a device of the character described, the combination with an electric motor having a starting winding and primary and supplementary running windings; of a plurality of switches normally rendering all of said windings effective for starting the motor; and means adapted automatically to actuate one of said switches to render the starting winding ineffective when the motor is operating properly and at normal load requirements, and adapted to actuate another of said switches to render the supplementary running winding ineffective and the primary running winding effective when the load requirements upon the motor are increased predeterminately.

6. In a device of the character described, the combination with an electric motor having a starting winding and main and supplementary running windings; of a plurality of switches cooperating normally to render all of said windings effective for starting the motor; and means adapted automatically to actuate one of said switches to render the starting winding ineffective when the motor is operating properly and at normal load requirements, and to actuate a second switch to render the supplementary running winding ineffective and the main running winding only effective when the load upon the motor is increased predeterminately beyond the normal load requirements, and to actuate a third switch for completely opening all of the motor winding circuits when it is subjected to dangerously excessive load requirements.

7. In a device of the character described, the combination with an electric motor having a starting circuit including a phase winding and a running circuit including main and supplementary windings; of a plurality of switches normally rendering all of the motor windings effective for starting purposes, one of said switches when actuated from normal position, breaking the starting circuit to render the phase winding ineffective, when the motor is running under normal load requirements, the second switch when actuated from normal position rendering the supplementary running winding ineffective and at the same time rendering the main running winding solely effective in response to a predetermined increase in load upon the motor; and thermo-electric means in electrical and mechanical connection with both said switches, and adapted to actuate said switches in accordance with the flow of current through the motor.

8. A device as defined by claim 7, characterized, however, by the fact that a third switch is provided which must necessarily be closed to render the other two switches effective and which is actuated by the thermo-electric means to render all of the circuits of the motor inoperative when the flow of current through the motor becomes excessive due to the motor being subjected to an exceedingly heavy load or becomes stalled.

PAUL H. RUTHERFORD.